United States Patent
Baehl et al.

(10) Patent No.: US 6,450,502 B1
(45) Date of Patent: Sep. 17, 2002

(54) ROTARY SEAL WITH RELIEF ANGLE FOR CONTROLLED TIPPING

(75) Inventors: Jeff Baehl, Fort Wayne, IN (US); Larry Castleman, New Haven, IN (US)

(73) Assignee: TI Specialty Polymer Products, Inc., Fort Wayne, IN (US)

( * ) Notice: Subject to any disclaimer, the term of this patent is extended or adjusted under 35 U.S.C. 154(b) by 0 days.

(21) Appl. No.: 09/418,713

(22) Filed: Oct. 15, 1999

Related U.S. Application Data

(60) Provisional application No. 60/108,797, filed on Nov. 14, 1998.

(51) Int. Cl.$^7$ .............................. F16J 9/05; F16J 5/24
(52) U.S. Cl. .................................. 277/387; 277/589
(58) Field of Search ........................................ 277/589

(56) References Cited

U.S. PATENT DOCUMENTS

| | | | | |
|---|---|---|---|---|
| 4,702,482 A | * | 10/1987 | Oseman | 277/165 |
| 4,953,876 A | | 9/1990 | Muller | |
| 5,092,610 A | * | 3/1992 | Dunham | 277/27 |
| 5,149,107 A | * | 9/1992 | Maringer | 277/165 |
| 5,172,921 A | * | 12/1992 | Stenlund | 277/237 |
| 5,433,452 A | | 7/1995 | Edlund et al. | |
| 5,607,166 A | | 3/1997 | Gorman | |
| 5,755,446 A | | 5/1998 | Dean et al. | |
| 6,105,970 A | * | 8/2000 | Siegrist | 277/458 |

FOREIGN PATENT DOCUMENTS

| | | | |
|---|---|---|---|
| CH | 1 437 734 | 2/1973 | F16J/15/32 |
| EP | 0 434 908 | 9/1990 | F16J/15/32 |
| GB | 2 264 541 | 1/1993 | F16J/15/54 |

\* cited by examiner

*Primary Examiner*—J. J. Swann
*Assistant Examiner*—Matthew E. Rodgers
(74) *Attorney, Agent, or Firm*—Randall J. Knuth

(57) ABSTRACT

A sealing device for sealing the gap between two relatively moving members is provided with a pivot point on its cross-sectional perimeter. As pressure against the seal increases, the seal rotates about the pivot point, resulting in an increased sealing surface area on the seal. Additionally, a recess is provided on the cross sectional perimeter, advantageously offering a more frictionless sealing relationship between the seal and the moving member. Further, a recess is provided on outer portion of the cross sectional perimeter on a surface of the seal that would contact an energizer ring, the recess eliminating a dynamic interface between the energizer ring and the seal.

6 Claims, 10 Drawing Sheets

INSTALLED CONDITION

HIGH PRESSURE
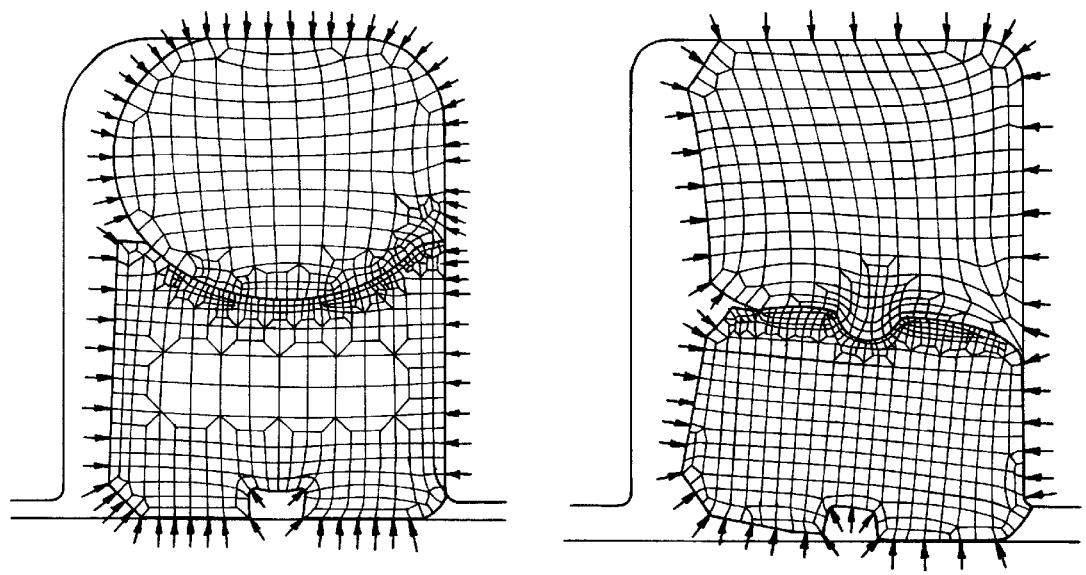
Fig. 5A PRIOR ART
Fig. 5B
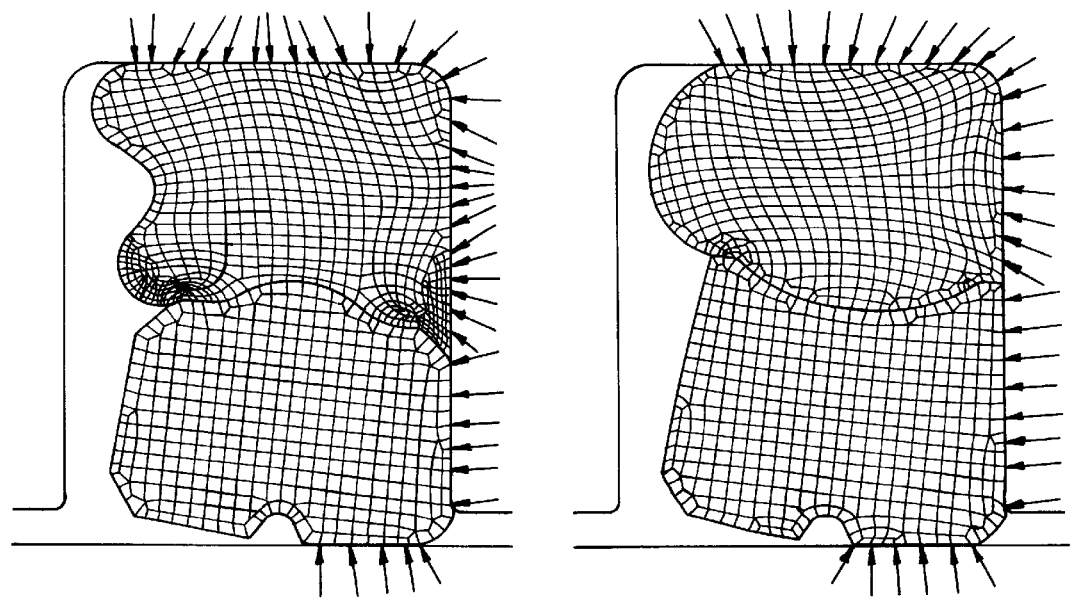
Fig. 5C
Fig. 5D

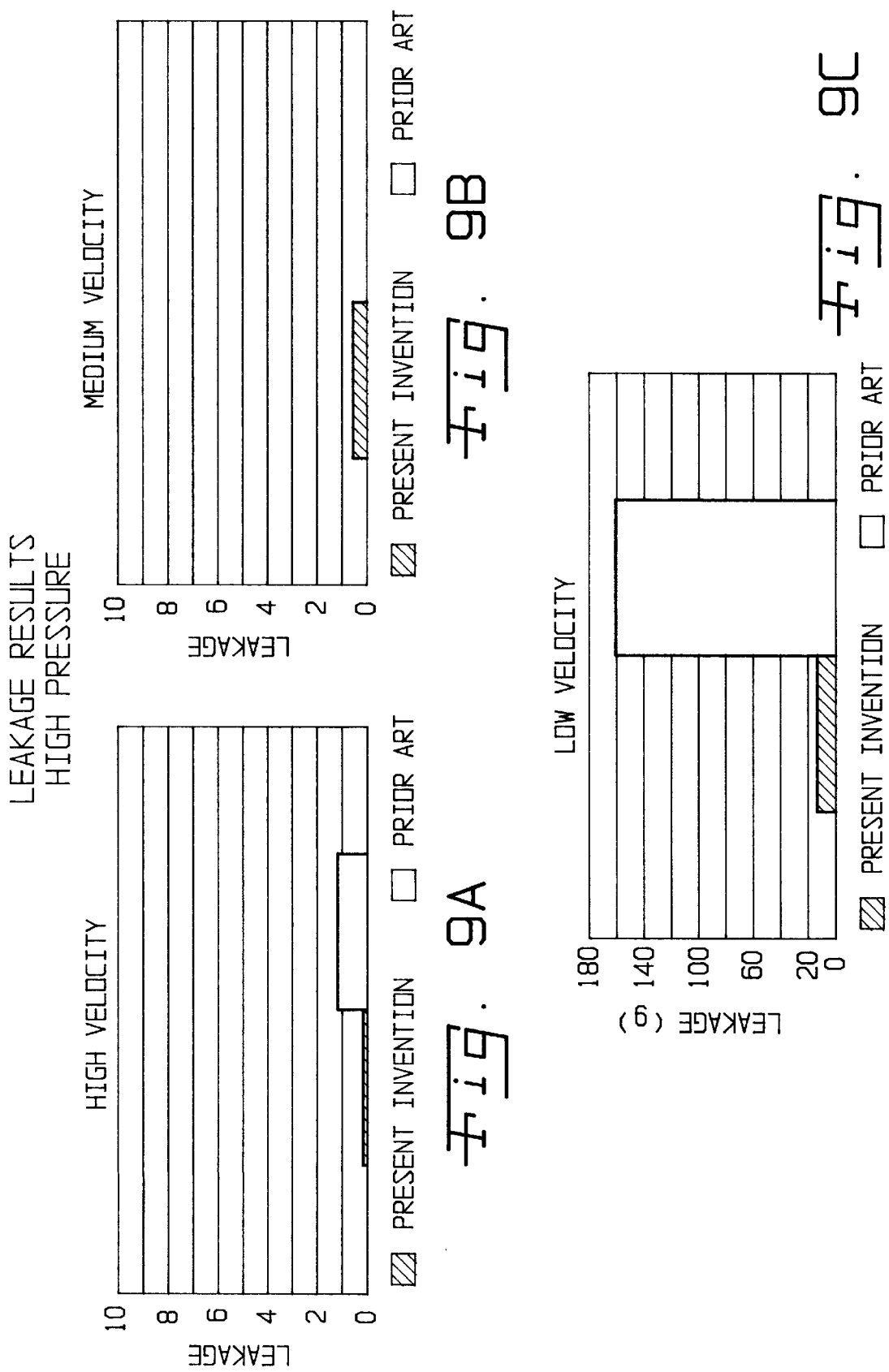

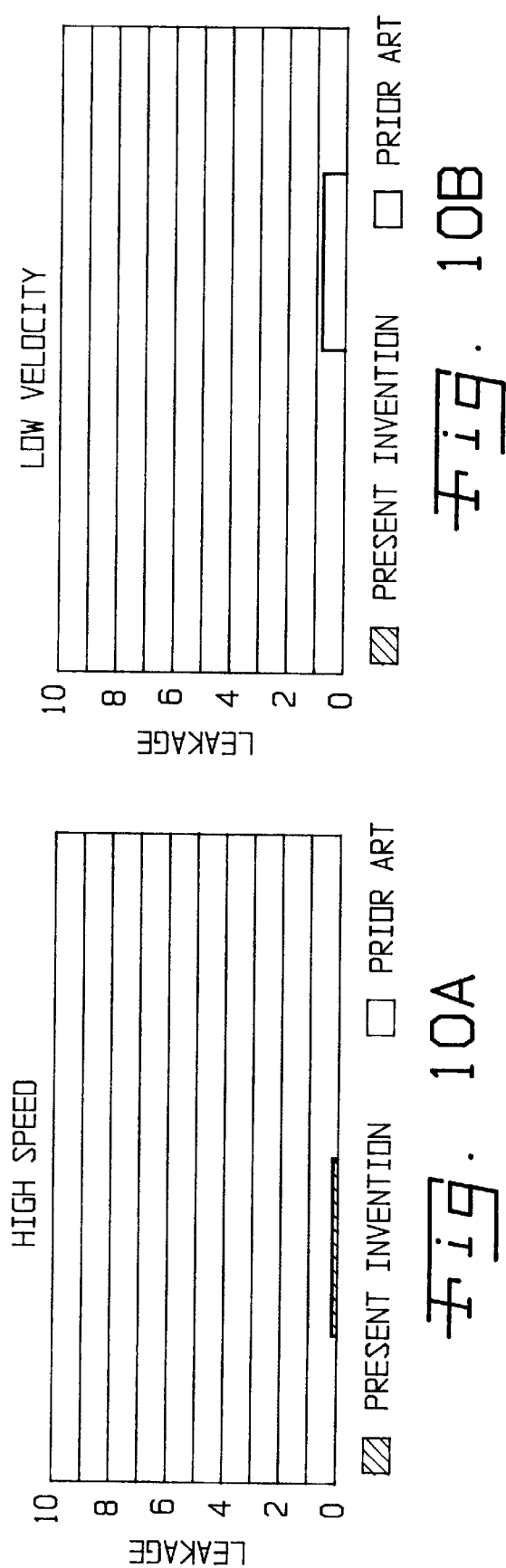

ROTARY SEAL WITH RELIEF ANGLE FOR CONTROLLED TIPPING

This application hereby claims the benefit of Provisional Patent Application No. 60/108,797 filed on Nov. 14, 1998, under Title 35 §119(e).

BACKGROUND OF THE INVENTION

1. Field of the Invention

The present invention relates to an improved rotary seal and energizer with pressure balancing and improved lubrication properties.

2. Description of the Related Art

Prior seals have limitations when given an applied pressure and relative velocity, i.e., when a sealed rod is rotated. In operation, typical pressure applications occur at 3000 PSI and above, and fairly low surface velocity movement of 10 to 50 feet per minute.

Due to the rotary motion and poor lubrication, the constant friction can lead to heat generation increases, thereby accelerating wear and causing seal extrusion and loss of material. During seal pressurization, the seal slides over in the groove and the energizer forms up in a corner creating a heavy load, resulting in high friction. This high friction accelerates heat generation, compression set, and possible loss of seal ring energization, which may also result in the creation of an undesirable dynamic interface created between the energizer and seal ring, thus producing undesirable abrasion and wear to the energizer.

SUMMARY OF THE INVENTION

To improve those situations, the present invention includes a pressure balance design which reduces overall friction during operation and improves the lubrication underneath the seal ring. Preliminary results indicate a reduction of torque of over fifty percent. Heat generation is also reduced by nearly fifty percent and an improved leakage control is also evident.

The seal ring of the present invention includes a lower center groove. The center groove is in the contact space between the seal ring and rod. The groove minimizes the bottom contact area, thus increasing the contact stresses and improving leakage control. When the system is pressurized, the seal ring pivots about a point on the bottom surface contact area, thereby providing a pressurized seal contact along a larger bottom contact area, while maintaining an extrusion resistant chamfer.

In the invention, a seal for sealing a gap between a first member and a second member moving relative to the first member comprises a ring with a cross section, the cross section having a pivot point and a perimeter. When external pressure is applied to the ring, for instance with the addition of fluid pressure, the ring responds by rotating about the pivot point.

In another embodiment of the invention, a seal arrangement is provided for sealing a gap between a first member and a second member, the second member moving relative to the first member, the seal arrangement comprising a first ring and a second ring. In this embodiment, the first ring has a cross section with a perimeter and a pivot point, the first ring pivoting about the pivot point when external pressure is applied. Additionally, a second ring is provided with a cross section and a perimeter.

In yet another embodiment of the invention, a seal for sealing a gap between a first member and a second member moving relative to the first member includes a ring having first surface and a second surface, the second surface sealingly engaging with the second member when the seal is subjected to external forces, and the second surface disengaging with the second member when the external forces are absent.

In a further embodiment of the invention, the seal arrangement comprises a first ring having a cross section with a perimeter, a first lip, a second lip, and a recess defined between the first lip and the second lip. Additionally, a second ring is provided and disposed between the first member and the first ring, the second ring having a perimeter that protrudes into the recess of the first ring during a pressurized state, and spans the recess during a non-pressurized state.

In an alternative embodiment of the invention, a sealing structure for sealing a gap between two machine parts arranged for motion relative to each other comprises a sealing ring having an inner surface facing the second machine part, the inner surface having a pivot point, a first lip, a second lip, a recess defined between the first and second lip, and an outer surface facing toward the first machine part, the sealing ring pivoting about the pivot point when exposed to external pressure. Additionally, an energizer ring is provided having a cross section with a perimeter, the energizer ring being disposed between the outer surface and the first machine part.

Yet another embodiment of the invention can be described as a method of sealing a gap between a first member and a second member, the second member moving relative to the first member, the method comprising the step of providing a ring capable of pivoting about a cross sectional point when subjected to external pressure.

The present invention is advantageous over the prior art seals in that it provides a sealing surface that increases in surface area as pressure against the seal escalates, while providing a high contact pressure profile at the sealing apex to improve leakage control. The increased sealing surface is accomplished by the rotation of the seal member during pressurized states, thereby placing a larger part of the seal in contact with a machine part when most needed.

It is a further advantage of the present invention that a reduced sealing surface is provided during low pressure operation. When the seal is in a low pressure state, and rotation about a pivot point has not yet occurred, the present invention advantageously provides a recess along its sealing surface, thereby reducing the amount of friction between the machine part and the seal.

It is yet another advantage of the present invention that a tapered wall is provided on a side of the seal, the tapered wall serving to firmly hold the seal in an ideal location against a surface of the seal housing once the seal has rotated about the pivot point.

It is a further advantage of the present invention that a recess is provided on the top surface of the seal, for interaction with an energizer ring. By providing a recess, ridge, bump, or other means of increasing surface area and simultaneously introducing localized high stresses, facing the energizer ring, the edges of the seal's recess transmit deforming pressure to the surface of the energizer ring during a pressurized state, thereby greatly increasing the coefficient of friction and/or the contact surface area, and consequently substantially eliminating a dynamic interface between the energizer ring and the seal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 5A shows an FEA graph of the embodiment shown in FIG. 4A under a high pressurization;

FIGS. 5B through 5D show FEA graphs of the embodiments shown in FIGS. 4B through 4D under a high pressurization;

FIGS. 9A through 9C are graphs showing the results of an accumulated leakage test at high pressure comparing the prior art design to the design shown in FIG. 1;

FIGS. 10A and 10B are graphs showing the results of an accumulated leakage test at medium pressure comparing the prior art design to the design shown in FIG. 1;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
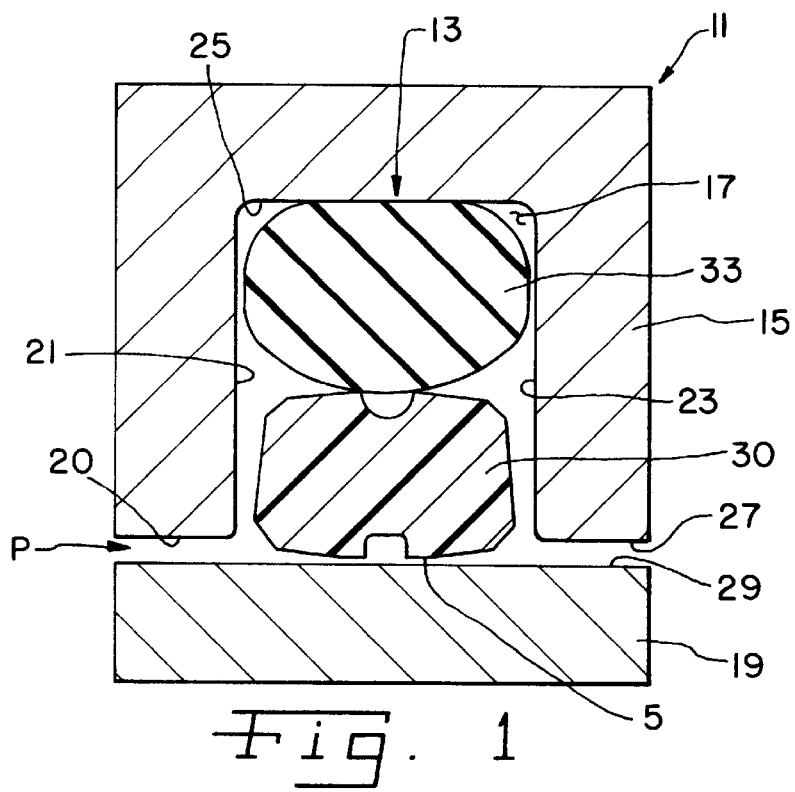
FIG. 1 is a fragmentary, sectional view on an axial plane and illustrating one form of seal construction of this invention.
Figure 2:
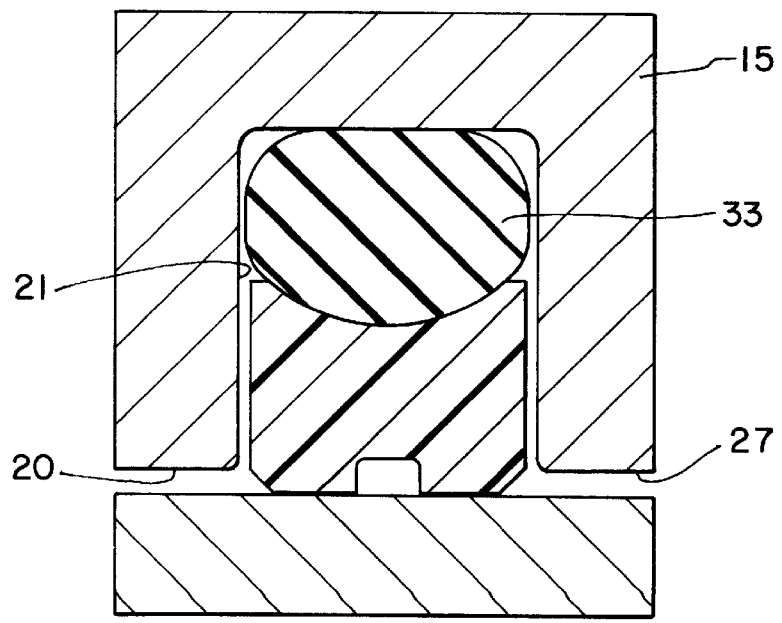
FIG. 2 is a fragmentary, sectional view of a prior art seal configuration.

Referring now to the drawings and particularly to FIG. 1, there is shown a construction which includes an annular seal assembly 13, an outer member 15 having an annular seal groove or gland 17 in which the seal assembly is mounted, 19. Fluid under pressure is applied to the seal assembly 13 in the direction of arrow P. The fluid passes through an annular clearance space 20 and acts directly on the seal assembly 13. It should be understood that members 15 and 19 are merely illustrative of one environment in which the seal assembly 13 can be advantageously utilized. In the embodiment illustrated, the members 15 and 19 are mounted for relative rotational movement.

Although the outer member 15 could be of various different configurations, in the embodiment illustrated, it includes axially spaced, radially extending walls 21 and 23 interconnected by an axial wall 25 to define the seal gland 17. The seal gland 17 completely circumscribes the inner member 19. In the embodiment illustrated, seal gland 17 is generally rectangular in an axial cross-section. The outer member 15 has a passage 27, extending there through, in which the inner member 19 is positioned.

The inner member 19 can be of various different configurations; however, in the embodiment illustrated, it is in the form of cylindrical shaft. The inner member 19 has the cylindrical outer surface 29, which defines one of the surfaces to be sealed.

Figure 8:
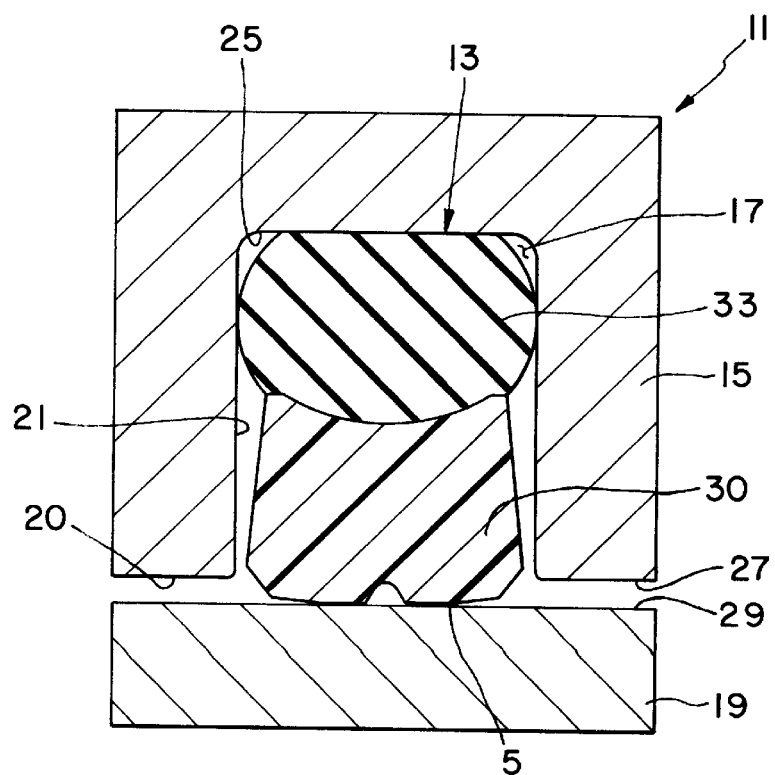
FIG. 8 is a fragmentary, sectional view on an axial plane and illustrating one form of seal construction of this invention.

The seal assembly 13 includes a seal element 30 and an annular resilient elastomeric member which, in the embodiment illustrated, is in the form of an o-ring elastomer 33. The elastomer energizer can be utilized in nearly any common form, as shown in FIG. 8. The seal element 30 can be constructed of any of the materials commonly used for this purpose, for example, a suitable plastic material such as thermoplastic may be used. Polytetrafluoroethylene (PTFE), thermoplastic elastomer (TPE), polyurethane (PU), and ultra high molecular weight polyethylene (UHMWPE) are examples of thermoplastics that can be utilized. An alternate embodiment of the system is shown in FIG. 8, having an element 30 with a different top surface.

Figure 3:
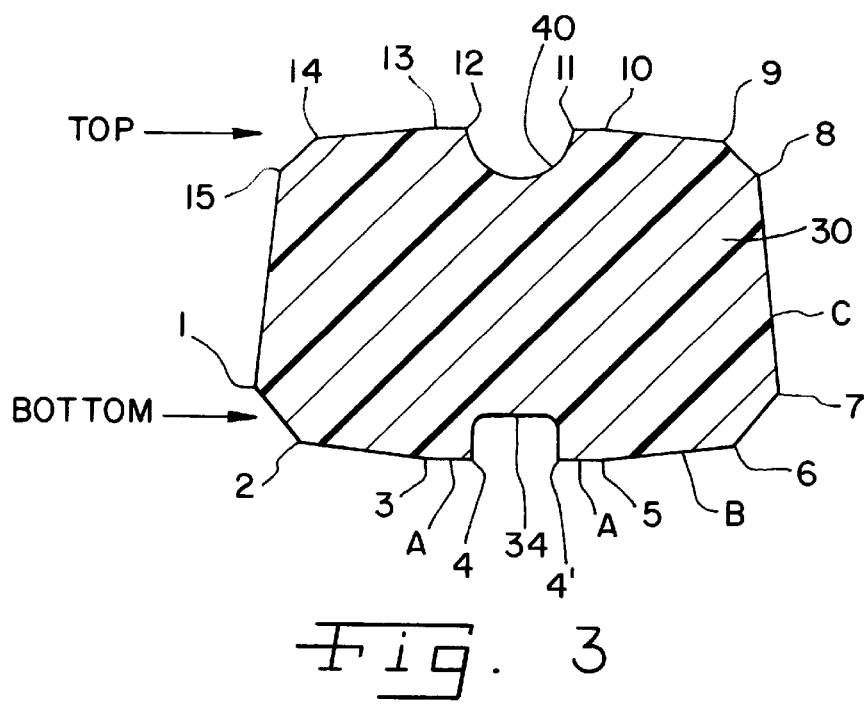
FIG. 3 is a fragmentary, sectional view of the seal element of the present invention.

The construction of the seal element 30 can best be understood with reference to FIG. 3, which shows the element isolated by itself. Generally, the seal 30 is of an annular configuration having a bottom surface A including a groove 34 for low pressure sealing.

For ease of description, the outer peripheral surface of seal element 30 will be described in relation to FIG. 3 in a counter clockwise fashion describing the different angles, edges, and surfaces. Starting from the lower left hand side, edge points 1, 2, 3, 4, 4', 5, 6, and 7 generally outline the lower bottom surface of surface element 30 while points 8, 9, 10, 11, 12, 13, 14, and 15 depict the changing contour on the top surface T of seal element 30. Generally bottom surface A is located between points 3 and 4, 4' and 5. This surface A is in contact with inner member 19 during a non-pressurized state of the seal assembly 13. Located between points 5 and 6 is a surface B, which creates an increased pressurized contact area during seal pressurization. Between points 6 and 7 is an extrusion resistant chamfer. During pressurization, seal element 30 tilts or rotates on point 5, bringing surface B into contact with member 19.

Between points 7 and 8 is a surface C, which is a relief angle to allow seal element 30 to tip upon edge 5 during edge seal pressurization. In the present invention, surface B and surface C are most preferably perpendicular to one another. In other preferred embodiments, an angle between surface B and surface C may range from 85° to 95°, but more preferably from 89 to 91°. Between edges 8 and 9 and edges 14 and 15 are disposed top chamfers that are provided to eliminate elastomer nibble.

One aspect of the invention, which is different from the prior art, is the ability to balance pressure and frictional aspects. During pressurization, the fluid pressure acts on the area from point 1 through 5 of the seal element 30 balancing against the pressure that is being generated through the elastomer, so seal element 30 seals along the width from point 5 to point 6. At pressurization, all of the force that is generating the torque is being driven only through point 5 to 6. This tipping about point 5 is where torque reduction occurs. This pressure balancing reduces the amount of load between the seal and the rod. The radial loading is reduced by a proportion of 1:7 to 5:7. To prevent extrusion, a chamfer is created between points 6 and 7.

To help facilitate the tipping or the rolling action, seal element 30 includes a back angle. This angle, or edge C is perpendicular to edge B allowing the seal to roll in the groove. Edge C will roll perpendicular to the rod and then also be parallel with the gland wall 23 during pressurization. As the elastomer 33 energizes across the top of seal element 30 it attempts to increase the friction between the elastomer 33 and the seal element 30, trying to keep the seal ring from not spinning with member 19, but rather to keep it within the gland 17.

Figure 4A:
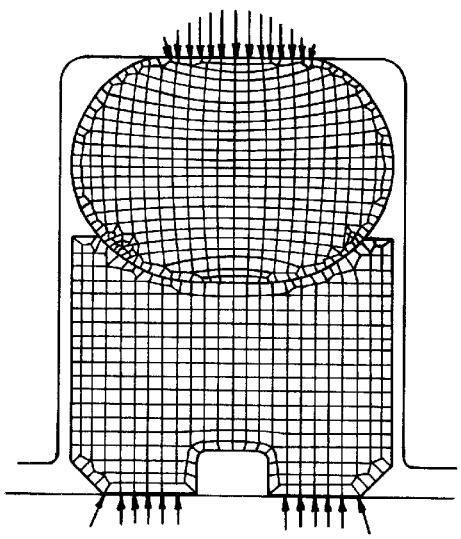
FIG. 4A shows an FEA graph of a Prior Art seal system, installed in an unpressurized state.
Figure 4B:
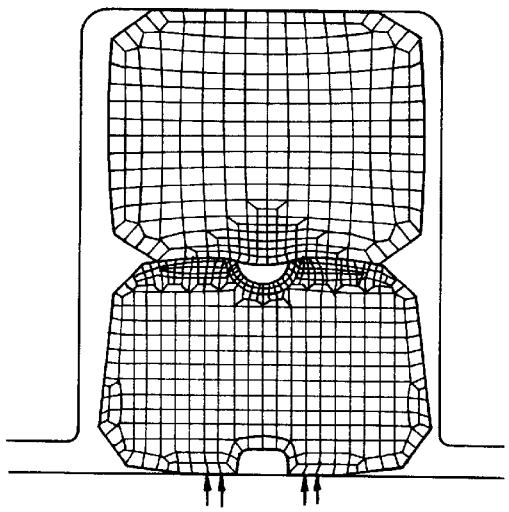
FIGS. 4B through 4D show FEA graphs of different embodiments of the present invention, installed in an unpressurized state, showing alternate energizers.
Figure 4C:
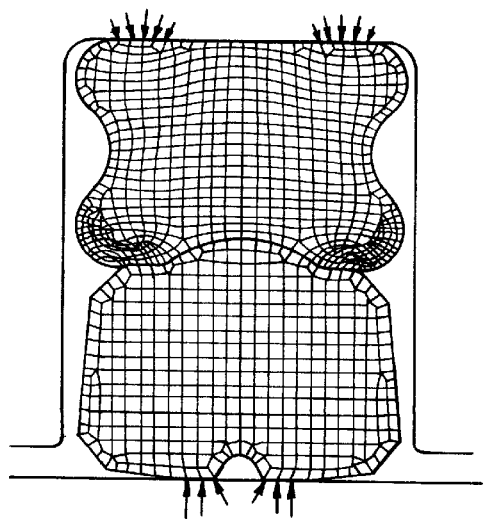
Figure 4D:
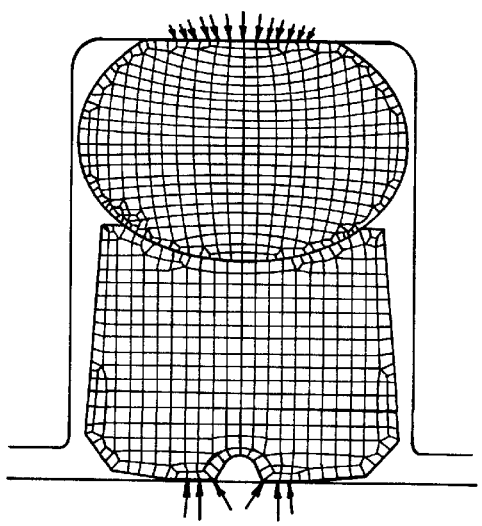

To eliminate a dynamic interface, a groove, ridge, bump, or other mechanical interlock 40 is provided on the top surface, as shown in FIGS. 4B through 4D. The elastomer 33 deflects down into groove 40 and points 11 and 12 experience high loads. There is a high strain on the elastomer 33 in that area. There is strain reduction between points 11 and 12. There is no seal element to support the elastomer 33 in groove 40, so the elastomer 30 deforms down in the groove creating a high stress concentration at 11 and 12. This increases the frictional properties and/or torque between the elastomer component 33 and the seal ring component 30, thereby providing a non-slipping and interlocking relationship between elastomer component 33 and seal ring component 30. Other modes of generating the increased friction are to increase the contact surface area between elements 30 through 33. Such increase is accomplished by changing the shape.

Elastomer 33 deflects as the seal element 30 is rolled over, and a stress concentration is also created therein. From point 10 down to point 9 there is an angle or surface which operates as a strain relief for the energizer. There is another such surface from the front side points 13 to 14. These angles relieve the elastomer as it is being energized. Any relief of the elastomer there allows the elastomer 33 to absorb some of the energy from the applied pressure. Energy from the applied pressure is also absorbed with the deformation of elastomer component 33 into groove 40 on the top surface and the chamber formed by the chamfered edge disposed between points 8 and 9.

FIGS. 4A through 5D show a finite element analysis of the normal contact stresses on the present invention in contrast to a prior art seal. FIGS. 5B through 5D shows the advantageous reduction of the contact area when the seal arrangement is pressurized. The greater-than-50% reduction in the contact area provides torque, heat generation, and frictional improvements compared to the prior art seal products.

FIGS. 6 through 12 show the advantages of the present invention with results of finite element analysis comparing the prior art seal to the present invention. The analysis was conducted using a test gland with tested surface velocities over the seal including low, medium, and high surface velocity, having constant rotation, and being subjected to low, medium, or high pressure for a duration of 200,000 cycles. The surface finish was in the range of 0.1 to 0.2 $\mu$m.

Figure 6:
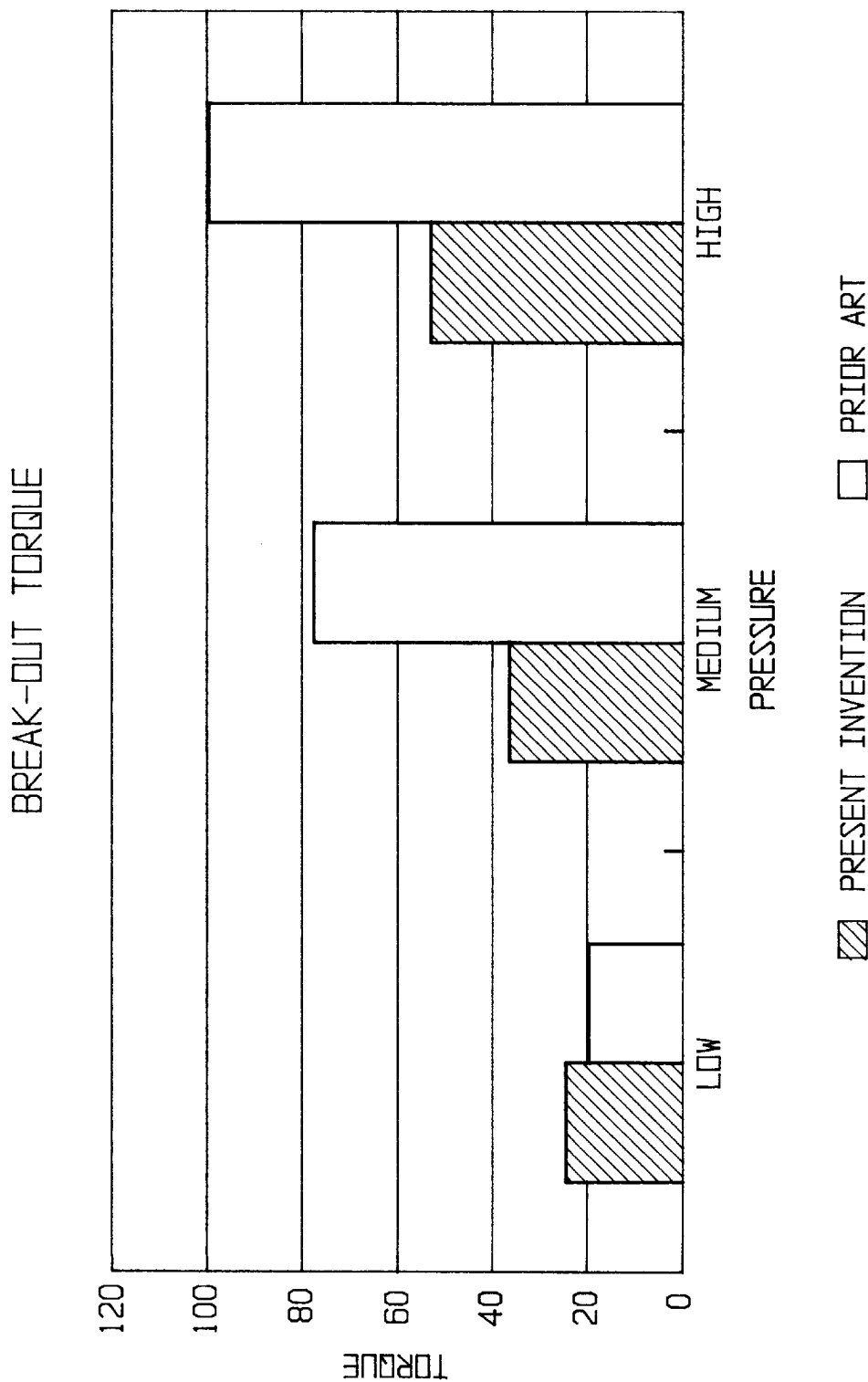
FIG. 6 is a graph showing the results of a breakout torque test comparing the prior art design to the design shown in FIG. 1.
Figure 7:
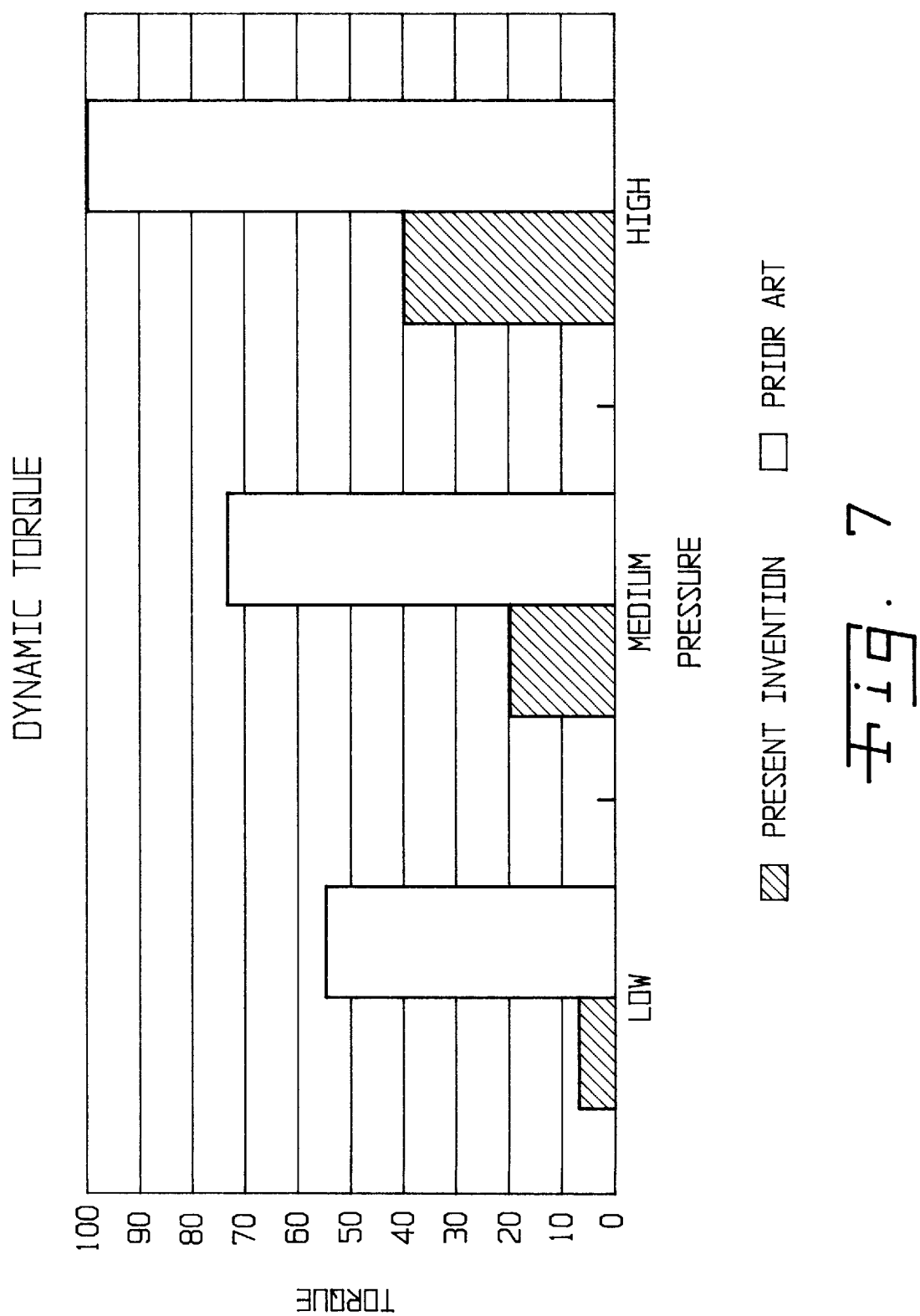
FIG. 7 is a graph showing the results of a dynamic torque test at low velocity comparing the prior art design to the design shown in FIG. 1.
Figure 11A:
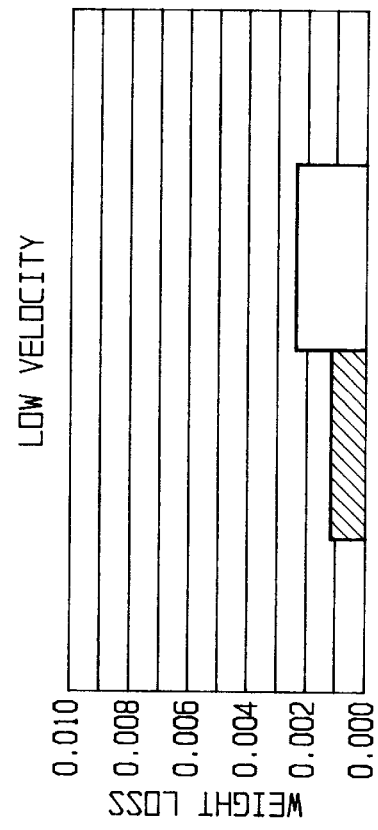
FIGS. 11A and 11B are graphs showing the results of a wear test at medium comparing the prior art design to the design shown in FIG. 1.
Figure 11B:
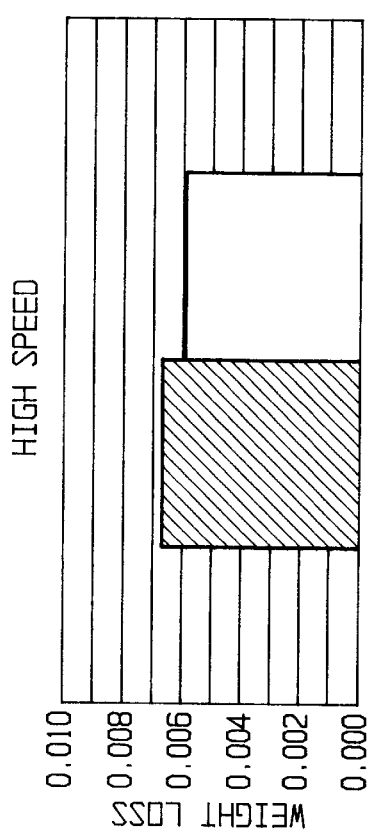
Figures 12A, 12B, 12C:
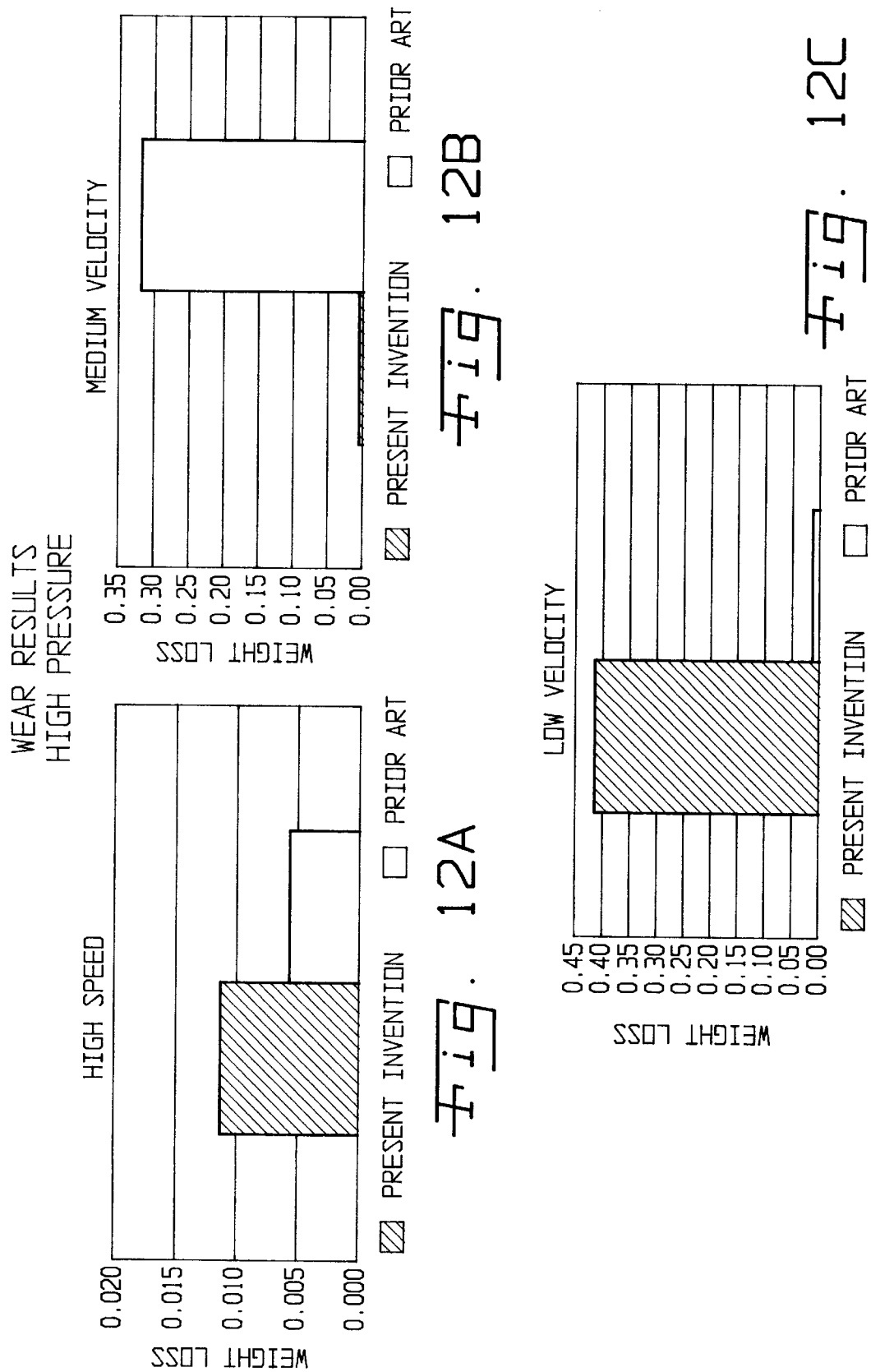
FIGS. 12A through 12C are graphs showing the results of a wear test at high pressure comparing the prior art design to the design shown in FIG. 1.

FIG. 6 displays the improved break-out torque results of the present invention over the prior art. FIG. 7 shows the dynamic torque improvements of the present invention over the prior art at low velocity. FIGS. 9A through 9C show accumulated leakage comparisons between the present invention and the prior art at high pressure. FIGS. 10A and 10B shows accumulated leakage comparisons between the present invention and the prior art at medium pressure. FIGS. 11A and 11B show wear result comparisons between the present invention and the prior art at medium pressure. FIGS. 12A through 12C show wear result comparisons between the present invention and the prior art at high pressure.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seal arrangement for sealing a gap between a first member and a second member moving relative to said first member, said seal arrangement comprising:

a first ring having a cross section with a perimeter, a first lip, a second lip, and a recess defined between said first lip and said second lip, said recess facing the first member and said first ring capable of pivoting when subjected to pressure; and a second ring having a cross sectional perimeter, said second ring disposed between said first ring and the first member, said second ring capable of pivoting when subjected to pressure and said second ring perimeter protruding into said recess during pressurized state, and said second ring perimeter spanning said recess during a non-pressurized state.

2. The seal arrangement of claim 1, wherein said second ring is an energizer.

3. The seal arrangement of claim 1, wherein said first ring is a seal element.

4. The seal arrangement of claim 1, wherein said first ring and said second ring are concentrically aligned.

5. The seal arrangement of claim 1, wherein said first lip and said second lip exert deforming stresses on said second ring perimeter during a pressurized state.

6. The seal arrangement of claim 5, wherein the deforming stresses provide an increased coefficient of friction between said first ring and said second ring.

* * * * *